United States Patent [19]

Tanouchi et al.

[11] Patent Number: 4,622,612

[45] Date of Patent: Nov. 11, 1986

[54] ELECTROLYTIC CAPACITOR

[75] Inventors: Tatsuji Tanouchi; Junichi Ushimoto; Satoru Okabayashi; Toshio Ikegawa, all of Kochi, Japan

[73] Assignee: Nippon Kodoshi Corporation, Kochi, Japan

[21] Appl. No.: 753,459

[22] Filed: Jul. 10, 1985

[30] Foreign Application Priority Data

Jul. 19, 1984 [JP] Japan .................. 59-150578

[51] Int. Cl.4 ............................. H01G 9/00
[52] U.S. Cl. .................... 361/433; 29/570
[58] Field of Search ......... 361/433, 312, 324; 29/570

[56] References Cited

U.S. PATENT DOCUMENTS 2,917,683 12/1959 Brennan ................. 361/433

FOREIGN PATENT DOCUMENTS 3005370 8/1981 Fed. Rep. of Germany ...... 361/433
56-131922 10/1981 Japan .
59-32121 8/1984 Japan .
416010 9/1934 United Kingdom ............. 361/433

Primary Examiner—Michael L. Gellner
Assistant Examiner—Douglas S. Lee
Attorney, Agent, or Firm—Shlesinger, Arkwright, Garvey & Fado

[57] ABSTRACT

An electrolytic capacitor comprises an anode foil, a cathode foil, and an electrolytic paper interposed between the anode foil and cathode foil. The electrolytic paper is formed with a plurality of discontinuous projections on its one side and recesses corresponding to the projections in its other side by a secondary working step after a paper producing step. This electrolytic paper is thicker and has a low density in comparison with its non-treated state before the secondary working step.

7 Claims, 4 Drawing Figures

ELECTROLYTIC CAPACITOR

BACKGROUND OF THE INVENTION (1) Field of the Invention

The present invention generally relates to an electroytic capacitor comprising an anode foil, a cathode foil and an electroytic paper impreganted with electrolyte which paper is interposed between these foils. In its particular aspects, the present invention relates to improvements in proportion defective caused by short circuit between these foils, impedance property, impregnation ability of electrolyte or the like.

(2) Description of the Prior Art

Generally, an electrolytic capacitor, particularly an aluminum electrolytic capacitor, is produced in following process. An electrolytic paper is interposed between an anode foil and a cathode foil, and they are winded up. Succeedingly, liquid electrolyte is penetrated into them, and finally their ends are sealed. The liquid electrolyte for this capacitor is the solution of boric acid or adipic acid soluted is penetrated into the capacitor element from both its ends.

In the above mentioned conventional aluminum electrolytic capacitor, the electrolyte is penetrated in the electrolytic paper, so that its impedance property is poor. Further, this electrolytic paper tends to easily worsen during a long use. In order to avoid the generation of such demerits, the value of resistance of the electrolyte is decreased, thickness or density of the electrolytic paper is decreased, and/or commonly used wood craft pulp for the electrolytic paper is replaced by the particular material such as a manila hemp pulp, an esparto pulp or the like.

However, these treatments also cause another problems. Decreasing the resistance value of the electrolyte causes the corrosion of aluminum foil. Decreasing the thickness or density of the electrolytic paper increases the number of defects owing to short circuit when the paper is rolled up to form the capacitor. Even if the short circuit is not generated at the rolling up step, the product in its market will be often troubled on account of the short circuit caused in the electrolytic paper.

As typical prior arts of the electrolytic capacitor, Japanese Patent Application Publications No. Sho. 59-32121 and No. Sho. 56-131922 have been known. In No. Sho. 59-32121, the object of this invention is to increase the impregnating speed of electrolyte and uniform the impregnation. Therefore, this invention provides one composition comprising a single electrolytic paper formed with the recessed grooves in the same way as the above. The depth of each grooves in the range of ¼ to ¾ of the thickness of the electrolytic paper.

In No. Sho. 56-131922, the object of this invention is to perform effectively the impregnation of electrolyte even when the rolled dimension of the capacitor is relatively large, and thus this invention provides an electrolytic capacitor characterized by forming transversely extending printed sections in at least one of an anode foil and a separating paper.

The above two prior arts are only effective to improve the impregnating speed of electrolyte. These inventions do not suggest any intention or effectiveness to improve the proportion defective depending on short circuit and the impedance property.

According to these inventions, the thickness of the electrolytic paper formed with the grooves (printed sections) is almost equivalent to that of a non-treated electrolytic paper. Or otherwise, the thickness of the treated paper is relatively thick. Even if the treated paper is scarcely thicker than the non-treated paper, the treated paper will return to the initial thickness in a short time. Consequently, these prior arts do not relate to the improvements in the proportion defective on account of short circuit and the impedance property.

General discussion on the relation between the proportion defective owing to short circuit and the impedance property is as follows.

In order to decrease the proportion defective, skilled artisan makes the electrolytic paper to be thick or high density. If the paper is kept at the same density, the value of CSF (Canadian Standard Freeness), referred to JIS P8121, which indicates the smashed degree of pulp as a raw mateial for the paper is also decreased.

With respect to the impedance property, the impedance property is worsened as a simple equation when the thickness is increased and worsened as a quadratic equation when the density is increased. On the otheer hand, the impedance property is not affected by the value of CSF. Accordingly, in order to improve the impedance property, the electrolytic paper should be thin and low density on the contrary to the improvement of proportion defective owing to short circuit.

In order to improve both the proportion defective and the impedance property at the same occasion, it is preferable to decrease the impedance property is not affected by the value of CSF. Thus it is ideal to make a low density electrolytic paper by using the material with the small value of the paper is always increased as the value of CSF. However, when the paper is produced by using the pulp mainly consisting of a natural cellulose such as a commonly used craft pulp, an isparto pulp, or the like, the density of the paper is always increased as the value of CSF is decreased. If the paper with the same thickness is propuced by the identical paper manufacturing machine, the value of CSF of the high density paper is smaller than that of the low density paper. Accordingly, the value of CSF is increased when the low density paper is used to improve the impedance property of the electrolytic capacitor. This causes to increased the proportion defective due to short circuit. On the other hand, in the case of the paper having smaller value of CSF, the paper density is high and therefore the impedance property is further worsened.

As a result, both the propertion defective and the impedance property could not be effectively improved at the same occasion.

(3) Object of the Invention

With these problems in mind, it is an object of the present invention to provide an elective owing to short circuit and impedance property.

The other object of the present invention is to provide an electrolytic capacitor which can be impregnated with an electrolyte for a short time.

SUMMARY OF THE INVENTION

To accomplish the above mentioned objects, the electrolytic capacitor of the present invention comprises the following structure. The electrolytic paper for the capacitor is formed with a plurality of discontinuous projecting sections on its one side and recessed sections by the secondary working step after a paper producting step. This structure can provide the electrolytic paper is thicker than its initial thickness and had a low density.

This means the density of the electrolytic paper formed with these projecting and recessed sections can be remarkably decreased in comparison with the initial paper before the secondary working step at the same value of CSF. Further, the value of CSF for the paper according to the present invention can be remarkably decreased in comparison with the electrolytic paper having the same thickness and same density produced by only a paper manufacturing machine.

The electrolytic capacitor containing the electrolytic paper with the above mentioned structure using any kind of material has a low impedance property, a low proportion defective owing to short circuit and a short period for impregnating the electrolyte in the capacitor.

Other objects, features and advantage of the present invention will become apparent upon perusal of the following detailed description of the preferred embodiments of the present invention.

DETAILED DESCRIPTION OF THE PREFERRED EMBODIMENTS

Figure 1:
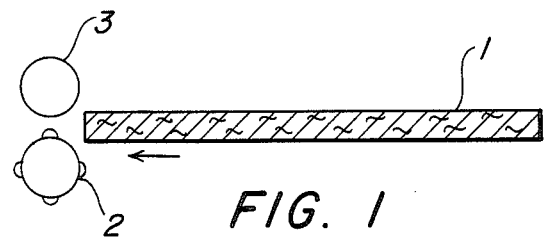
FIG. 1 is a schematic view showing a cross-section of the initially formed electrolytic paper prior to its passage through the secondary working step.
Figure 2:
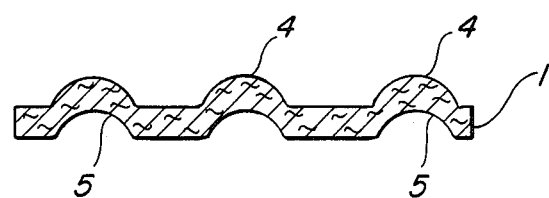
FIG. 2 is a cross-sectional view of the electrolytic paper of FIG. 1 after the secondary working step.

Hereinafter, the present invention is explained in detail with referring to a preferred embodiment.

As a material for an electrolytic paper, a manila hemp pulp with CSF value of 400 cc is supplied to a commonly used paper manufacturing machine to produce the electrolytic paper 1. The resulted paper is succeedingly supplied to a secondary working roll and a cotton roll is arranged. In this secondary working step, the paper supplied from the paper manufacturing machine is forcedly passed through the narrow space between the engraving roll 2 and the cotton roll 3 under the linear pressure of 90 kg/cm and at the temperature of 100° C. The engraving roll is provided with a plurality of dome shape projections. Each height of the projection is 65 $\mu$m and they are discontinuously arranged at a rate of 80 projections/inch. Thus the paper is formed with a plurality of discontinuous projections 4 in its one surface. The other surface is therefore formed with recesses 5 corresponding to the projections. The embossed paper becomes substantially thicker than its initial state, before the embossing work. The initial thickness and density of the pre-embossing paper are preferably 60 $\mu$m or less and 0.3 g/cm$^3$ or more, respectively. The increment percentage after the embossing work is preferably 10 to 150% of the initial thickness. It is preferable that the value of CSF is 700 cc or less for the initial thickness of 50 to 60 $\mu$m, the value of CSF is 650 cc or less for the thickness of 40 to 50 $\mu$m, the value of CSF is 600 cc or less for the thickness of 30 to 40 $\mu$m, the value of CSF is 550 cc or less for the thickness of 20 to 30 $\mu$m, and the value of CSF is 500 cc or less for the thickness of 10 to 20 $\mu$m. This secondary working step is intended to increase essentially the thickness of the electrolytic paper, so that the engraving roll of the embossing machine is not limited to the specific pattern and the working condition is not also limited. Further, a crepe finish can be also employed for the working step. The material for the electrolyte paper is selected from a wood craft pulp, a manila hemp pulp, an esparto pulp, a sisal hemp pulp, or the combination of these.

Figure 3:
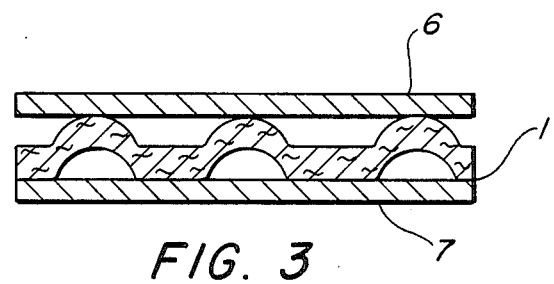
FIG. 3 is a cross-sectional view of the embossed electrolytic paper sandwiched between an anode foil and a cathode foil.

As shown in FIG. 3, after the electrolytic paper has been subjected to the secondary working step, it is interposed between an anode foil 6 and a cathode foil 7.

Figure 4:
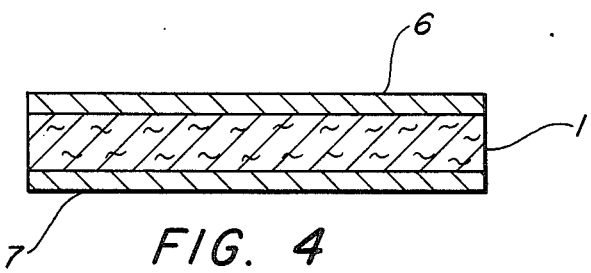
FIG. 4 is a cross-sectional view of the electrolytic paper sandwiched between the anode foil and the cathode foil in an expanded state subsequent to treatment with the electrolyte.

As shown in FIG. 4, electrolytic paper 1 becomes swollen after it is impregnated with liquid electrolyte.

According to the above treatment, the density of the electrolytic paper becomes lower than that of the initial state and also the value of CSF of the resulted paper becomes remarkably lower than that of the paper having the same density produced by only the paper manufacturing machine. This results in decreasing the proportion defective sue to short circuit, investing a low impedande property, and shortening time for impregnating a liquid electrolyte into the electrolytic paper. These effects are explained in detail as follows.

Firstly, the density P of the electrolytic paper is represented by the following equation; P=Basis Weight (gm$^2$)/Thickness ($\mu$m) The density P is naturally decreased as the thickness is increased without changing the basis weight. Therefore, the electrolytic capacitor comprising this electrolytic paper can be improved in its impedance property, and proportion defective owing to short circuit in comparison with the other which is composed of the non-treated paper. If the treated electrolytic paper is compared with the other electrolytic paper produced by a conventional paper manufacturing machine with the same thickness and density as the former paper with respect to the value of CSF of the treated paper is smaller than that of the later. Thus the electrolytic capacitor containging this treated paper is remarkably improved in its proportion defective due to short circuit. Further, the electrolyte impregnation with the electrolytic paper manufacturing machine, not to mention the pre-treated paper.

According to the present invention, the electrolytic paper having low density can be produced by using the material having a low CSF value. This electrolytic paper having such merits could not be produced in the prior art.

In order to clear the difference between the electrolytic paper according to the present invention and the conventional papers, comparative tests were carried out as follows.

A first aluminum electrolytic capacitor was prepared by using a non-treated electrolytic paper which was not subjected to the secondary working step of the present invention. This was referred as "Non-Treated Paper" in the following tables. A second aluminum electrolytic capacitor was prepared by using a treated electrolytic paper which was embossed to increase the thickness and decrease the density than the initial state after paper manufacturing process. This was referred as "Treated Pater" in the tables. A third aluminum electrolytic capacitor was prepared b7 using a conventional electrolytic paper with the substantially same thickness and density as the treated paper which conventional paper was produced by only a conventional paper manufacturing machine. This was referred as "Conventional Paper" in the tables. Raw material for the above three type electrolytic paper was a manila hemp pulp. These three type electrolytic capacitors were tested on their proportion defective due to short circuit C, impedance Z, and tensile strenght, respectively. The results are shown in Table 1.

Referring to Table 1, Test No. 3 is pecked up as an example for explaining the table. A paper was produced by using a manila hemp pulp with the value of CSF 400 cc. The produced paper had thickness of 30.6 μm and density of 0.63 g/cm$^3$. This paper was treated by an embossing machine to form a treated paper having density of 0.43 g/cm$^3$ and thickness of 49.2 μm. The electrolytic capacitor containing the non-treated paper. That is, impedance Z is decreased from 2.5 Ω to 1.9 Ω and proportion defective C is decreased from 4.2% to 0.5%. The other hand, the conventional paper was produced by using a manila hemp pulp with the value of CSF 670 cc. The produced paper had thickness of 50.6 μm and density of 0.41 g/cm$^3$. The electrolytic capacitor containing this conventional paper was prepared and compared with the emboss treated paper. Both the capacitors resulted in the same impedance 1.9 Ω, but the capacitor with emboss treated paper is superior to the other with regard to the proportion defective C is 0.5% vs 6.3%. This result is based in the value of CSF. Consequently, the other tests in Table 1 indicate the aluminum electrolytic papre capacitor according to the present invention is superior to the conventional paper containing capacitor, for instance the proportion defective C of the treated paper is remarkably decreased, the tensile strength is also improved, and the impedance Z is kept constant.

In the same manner as the above, Table 2 shows the results of crafe pulp fpr the aterial of the electrolytic papre; Table 2 shows the results of combination of manila hemp and esparto pulp for the electrolytic papre, and Table 4 shows the results of sisal hemp pulp for the electrolytic paper.

TABLE 1

(Material; Manila Hemp Pulp)

| Test No. | Electrolytic Paper | CSF cc | Thickness μm | Density g/m$^3$ | Basis Weight g/m$^2$ | Type of paper Manufacturing Machine | C (%) | Z (Ω) | Tensil Strength (kg/15 mm width) |
|---|---|---|---|---|---|---|---|---|---|
| 1 | Non-Treated Paper | 0 | 15.4 | 0.75 | 11.5 | Fourdrinier Type | 3.5 | 2.8 | 1.8 |
|   | Treated Paper | 0 | 25.1 | 0.47 | 11.9 | Fourdrinier Type | 0.6 | 1.4 | 1.3 |
|   | Conventional Paper | 490 | 25.0 | 0.46 | 11.5 | Clinder Type | 20.6 | 1.1 | 1.1 |
| 2 | Non-Treated Paper | 100 | 20.5 | 0.73 | 14.6 | Clinder Type | 5.9 | 2.0 | 2.8 |
|   | Treated Paper | 100 | 34.8 | 0.43 | 15.0 | Clinder Type | 0.4 | 1.6 | 1.6 |
|   | Conventional Paper | 470 | 35.3 | 0.43 | 15.1 | Clinder Type | 10.0 | 1.6 | 1.8 |
| 3 | Non-Treated Paper | 440 | 30.6 | 0.63 | 19.5 | Clinder Type | 4.2 | 2.5 | 5.5 |
|   | Treated Paper | 440 | 49.2 | 0.43 | 21.2 | Clinder Type | 0.5 | 1.9 | 3.8 |
|   | Conventional Paper | 670 | 50.6 | 0.41 | 20.7 | Clinder Type | 6.3 | 1.9 | 3.0 |
| 4 | Non-Treated Paper | 590 | 40.3 | 0.61 | 24.6 | Clinder Type | 0.8 | 2.9 | 6.1 |
|   | Treated Paper | 590 | 61.5 | 0.40 | 24.6 | Clinder Type | 0.2 | 2.2 | 4.3 |
|   | Conventional Paper | 715 | 60.2 | 0.41 | 24.7 | Clinder Type | 2.2 | 2.3 | 3.5 |
| 5 | Non-Treated Paper | 610 | 50.3 | 0.53 | 26.7 | Clinder Type | 0.4 | 3.5 | 6.5 |
|   | Treated Paper | 610 | 81.2 | 0.33 | 27.0 | Clinder Type | 0.0 | 2.6 | 4.5 |
|   | Conventional Paper | 750 | 80.7 | 0.35 | 28.0 | Clinder Type | 0.8 | 2.4 | 3.3 |

TABLE 2

(Material; Craft Paper)

| Test No. | Electrolytic Paper | CSF cc | Thickness μm | Density g/m$^3$ | Basis Weight g/m$^2$ | Type of paper Manufacturing Machine | C (%) | Z (Ω) | Tensil Strength (kg/15 mm width) |
|---|---|---|---|---|---|---|---|---|---|
| 1 | Non-Treated Paper | 0 | 15.1 | 0.75 | 11.3 | Fourdrinier Type | 4.0 | 2.8 | 1.5 |
|   | Treated Paper | 0 | 25.3 | 0.45 | 11.4 | Fourdrinier Type | 0.7 | 1.5 | 1.1 |
|   | Conventional Paper | 410 | 25.1 | 0.44 | 11.0 | Clinder Type | 21.3 | 1.5 | 0.8 |
| 2 | Non-Treated Paper | 0 | 19.8 | 0.74 | 14.7 | Fourdrinier Type | 2.2 | 3.7 | 2.7 |
|   | Treated Paper | 0 | 35.6 | 0.40 | 14.3 | Fourdrinier Type | 0.4 | 2.2 | 1.9 |
|   | Conventional Paper | 430 | 34.0 | 0.41 | 14.0 | Clinder Type | 11.7 | 2.1 | 1.5 |
| 3 | Non-Treated Paper | 350 | 31.6 | 0.65 | 20.5 | Clinder Type | 4.5 | 3.5 | 3.8 |
|   | Treated Paper | 350 | 48.3 | 0.41 | 19.8 | Clinder Type | 0.7 | 2.9 | 2.1 |
|   | Conventional Paper | 650 | 50.0 | 0.42 | 21.0 | Clinder Type | 5.3 | 3.0 | 1.6 |
| 4 | Non-Treated Paper | 550 | 40.8 | 0.59 | 24.1 | Clinder Type | 0.8 | 4.4 | 4.1 |
|   | Treated Paper | 550 | 62.6 | 0.40 | 24.9 | Clinder Type | 0.1 | 3.2 | 3.1 |
|   | Conventional Paper | 715 | 61.8 | 0.41 | 25.3 | Clinder Type | 2.2 | 3.1 | 1.3 |
| 5 | Non-Treated Paper | 585 | 50.1 | 0.55 | 27.5 | Clinder Type | 0.3 | 5.3 | 3.7 |
|   | Treated Paper | 585 | 80.7 | 0.36 | 29.0 | Clinder Type | 0.0 | 2.7 | 3.1 |
|   | Conventional Paper | 715 | 80.3 | 0.35 | 28.1 | Clinder Type | 0.8 | 2.7 | 1.5 |

TABLE 3

(Material; Manila Hemp + Esparto Pulp)

| Test No. | Electrolytic Paper | CSF cc | Thickness μm | Density g/m$^3$ | Basis Weight g/m$^2$ | Type of paper Manufacturing Machine | C (%) | Z (Ω) | Tensil Strength (kg/15 mm width) |
|---|---|---|---|---|---|---|---|---|---|
| 1 | Non-Treated Paper | 380 | 30.6 | 0.63 | 19.5 | Clinder Type | 4.2 | 2.3 | 3.8 |
|   | Treated Paper | 380 | 49.2 | 0.43 | 21.2 | Clinder Type | 0.5 | 1.9 | 2.5 |
|   | Conventional Paper | 670 | 50.6 | 0.41 | 20.7 | Clinder Type | 6.3 | 1.9 | 2.3 |
| 2 | Non-Treated Paper | 590 | 40.3 | 0.61 | 24.6 | Clinder Type | 0.8 | 2.7 | 4.8 |
|   | Treated Paper | 590 | 61.5 | 0.40 | 24.6 | Clinder Type | 0.2 | 2.2 | 3.5 |
|   | Conventional Paper | 715 | 60.2 | 0.41 | 24.7 | Clinder Type | 2.2 | 2.3 | 3.0 |

TABLE 4

| | (Material; Sisal Hemp Pulp) | | | | | | | |
|---|---|---|---|---|---|---|---|---|
| Test No. | Electrolytic Paper | CSF cc | Thickness μm | Density g/m$^3$ | Basis Weight g/m$^2$ | Type of paper Manufacturing Machine | C (%) | Z (Ω) | Tensil Strength (kg/15 mm width) |
| 1 | Non-Treated Paper | 100 | 20.6 | 0.70 | 14.4 | Clinder Type | 5.9 | 1.9 | 2.5 |
| | Treated Paper | 100 | 35.0 | 0.41 | 14.4 | Clinder Type | 0.4 | 1.5 | 1.2 |
| | Conventional Paper | 420 | 35.8 | 0.42 | 15.0 | Clinder Type | 13.0 | 1.6 | 1.3 |
| 2 | Non-Treated Paper | 380 | 31.1 | 0.64 | 19.8 | Clinder Type | 4.2 | 2.4 | 4.5 |
| | Treated Paper | 440 | 49.2 | 0.43 | 21.2 | Clinder Type | 0.5 | 1.9 | 3.2 |
| | Conventional Paper | 670 | 50.6 | 0.41 | 20.7 | Clinder Type | 16.3 | 1.9 | 2.8 |
| 3 | Non-Treated Paper | 590 | 40.3 | 0.61 | 24.6 | Clinder Type | 0.8 | 2.6 | 5.3 |
| | Treated Paper | 590 | 61.5 | 0.40 | 24.6 | Clinder Type | 0.2 | 2.2 | 3.8 |
| | Conventional Paper | 715 | 60.2 | 0.41 | 24.7 | Clinder Type | 2.2 | 2.3 | 3.1 |

As is clear from these results, the electrolytic capacitors containing the paper prepared by the embossing treatment according to the present invention are superior to the capacitors containing the non-treated paper or conventional paper regardless of the kind of papers.

Whilse the described embodiment represents the preferred form of the present invention, it is to be understood that modifications will occure to those skilled in that art without departing from the spirit of the invention. The scope of the invention is therefore to be determined by the appended claims.

What is claimed is:

1. An electrolytic capacitor comprising an anode foil, a cathode foil, and an electrolytic paper interposed between the anode foil and the cathode foil, which electrolytic paper is formed with a plurality of discontinuous projecting sections on its one side and recessed sections corresponding to the projecting sections in its other side by a secondary working step after a paper producing step, whereby said electrolytic paper is thicker and has low density in comparison with its initial state after the paper producing step.

2. An electrolytic capacitor according to claim 1, wherein said electrolytic paper is formed with embossed pattern by an embossing machine at the secondary working step, which machine comprises an engraving roll and a cotton roll.

3. An electrolytic capacitor according to claim 2, wherein the increment percentage after the secondary working step is 10 to 150% of the initial thickness of the paper.

4. An electrolytic capacitor according to claim 2, wherein the material for the electrolytic paper is selected from a wood craft pulp, an esparto pulp, a sisal hemp pulp, or the combination of these.

5. An electrolytic capacitor according to claim 1 wherein the increment percentage after the secondary working step is 10 to 150% of the initial thickness of the paper.

6. An electrolytic capacitor according to claim 5, wherein the material for the electrolytic paper is selected from a wood craft pulp, an esparto pulp, a sisal hemp pulp, or the combination of these.

7. An electrolytic capacitor according to claim 1, wherein the material for the electrolytic paper is selected from a wood craft pulp, an esparto pulp, a sisal hemp pulp, or the combination of these.

* * * * *